July 29, 1969  J. H. DUVALL ETAL  3,457,665
FISHLINE JERKING DEVICE
Filed Jan. 11, 1968
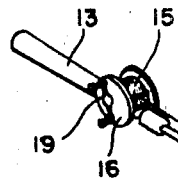
FIG. 1
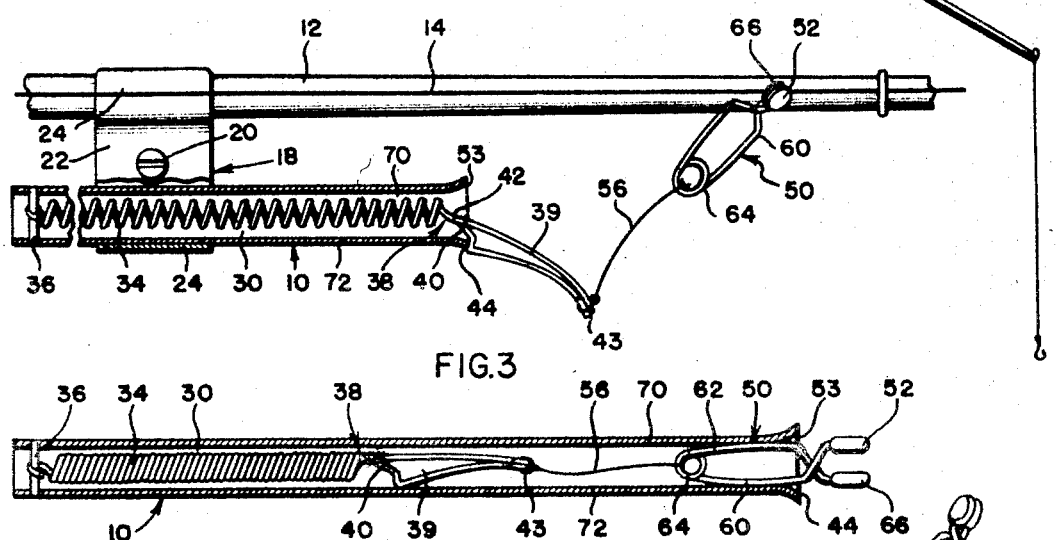
FIG. 2
FIG. 3
FIG. 4
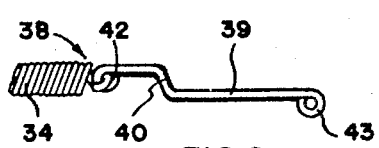
FIG. 5
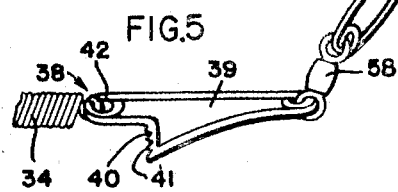
FIG. 6
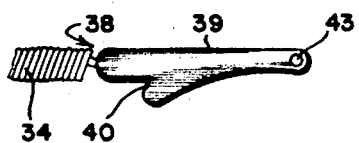
INVENTORS
John J. Duvall
James H. Duvall
*B. J. Bojanowski*
ATTY.

3,457,665
FISHLINE JERKING DEVICE
James H. Duvall, Burch's Trailer Court, #C30, Bourbannais, Ill. 60914, and John J. Duvall, 2293 Yorkshire Drive, Decatur, Ill. 62526
Filed Jan. 11, 1968, Ser. No. 697,150
Int. Cl. A01k 97/00
U.S. Cl. 43—15                                                8 Claims

ABSTRACT OF THE DISCLOSURE

An automatic fishline jerking device for mounting on a fishing rod which consists of a tubular housing having an elasticized trigger mechanism secured within the housing. A fishline clamping mechanism is connected to the trigger mechanism, the clamping mechanism being capable of automatically releasing a fishline when the clamping mechanism is drawn into the tubular housing by the elasticized portion of the trigger mechanism.

Disclosure of invention

This invention relates to a device adapted for use on fishing apparatus and particularly to a device for automatically causing a spasmodic or jerking withdrawal of a fishline on receiving an actuating signal transmitted along a fishline.

It is generally recognized among anglers that if a fish "nibbling" on a baited fishline is to be successfully landed, it is essential that the baited hook first becomes securely imbedded in the fish's mouth before the angler attempts to withdraw the fish from the water, otherwise there is a good chance that the fish will be lost. The hook is normally secured in the fish's mouth when the angler quickly jerks his fishline on receiving a signal which indicates to him that the point of the hook is in contact with, or has penetrated the fish's mouth. The jerking action forces the barb portion of the hook deep into the fish's mouth making removal of the hook extremely difficult. The presence of a fish is generally signaled by a slight tautening of a fishline or if a bobber is attached to the line, by the bobber's sudden disappearance below the surface of the water.

If the angler is vigilant and responds quickly to the signal he can, in most cases, secure the hook in the fish's mouth before the fish has an opportunity to get away. However, for this to occur the angler must give his full and continuous attention to the issue of fishing. Many times, though, other matters must be attended to, forcing the angler to direct his attention elsewhere. More times than not, it is usually during this period that "the big one" appears and gets away leaving the angler with only a fading but aggrandizing recollection of the one that got away.

It would, therefore, be advantageous if a device was available to the angler which would automatically supply this jerking action to a fishline even though the angler's attention is directed elsewhere. Over the years many such devices have been proposed, some of which are described in U.S. Patents 2,590,721; 2,850,831; and 2,659,174.

However, most of the above proposed devices require complicated and costly triggering mechanisms and, in most respects, do not possess the simplicity and efficiency provided by the device of the instant invention. Another and possibly an even more objectionable feature associated with the devices heretofore proposed, is that once the device has been connected to the fishline and has been actuated, there is no convenient and quick means available for releasing and separating the device from the fishline and, thus, allow for non-interfering use of the reel if the need arises. In some instances, the quick spasmodic action of the devices heretofore proposed caused fishline backlash resulting in snarls and tangles and making efficient and effective use of the reel virtually impossible.

It is, therefore, an object of this invention to provide a fishline jerking device which not only overcomes the disadvantages associated with previously proposed devices but also to provide a device which is inexpensive, highly dependable and which avoids snarling and tangling of the fishline after the device has been actuated.

Another object of this invention is to provide a fishline jerking device which will automatically release and free a fishline from the device after the jerking action has been accomplished.

Other objects of this invention will be apparent from the drawings and description which subsequently follow.

These and other objects of this invention are accomplished by the device of this invention which is described below and shown in the accompanying drawings in which:

FIGURE 1 shows a perspective view of the device of this invention mounted laterally along the side of a fishing rod and connected to a fishline.

FIGURE 2 shows a broken side sectional view of the device in a cocked or activated position.

FIGURE 3 shows a side section of the device in a sprung or released condition with the jaws of the clamping means opened.

FIGURES 4, 5 and 6 are side perspectives of various forms of triggering mechanisms which can be used in other embodiments of this invention.

Referring back to FIGURE 1, it can be seen that the device of this invention, represented generally by numeral 10, is attached along the side of a conventional type of fishing rod 12 by mounting means 18. The rod is shown equipped with a reel 16 which is mounted on the handle 13 of the fishing rod. Rod 12 has attached thereto, and at spaced intervals, eyes 17 through which a fishline 14 passes. The fishline is collected on spool 15 by turning handle 19 positioned on the side of the reel. The device of this invention is shown connected to fishline 14 by clamping means 50 which in turn is connected to trigger means 38 by connecting means 56.

With reference now to FIGURE 2, the device of this invention is shown mounted on fishing rod 12 by a mounting means shown generally by numeral 18.

Although most any type of mounting means can be used for holding the device of this invention to a fishing rod, the mounting means is preferably of the type which can be adjusted quickly and easily to fit most any type or shape of fishing rod. In one specific embodiment, as shown in FIGURE 2, the mounting means consists of two metal plates or skirts 22 (one of which is cut away) held in position by adjustable screw 20. Preferably, the top and bottom end portions 24 of the skirts are slightly curved or rounded to more generally accommodate the rounded side walls of a fishing rod and the side walls of the elongated tubular housing 30. Tubular housing 30 is firmly held in place on fishing rod 12 with mounting means 18 by tightening adjustable screw 20. If desired, the mounting means can be a single U-shaped metal piece equipped with an adjusting screw which can be tightened or loosened depending on the size and shape of the fishing rod.

The fishline jerking device of this invention, shown most clearly in FIGURES 2 and 3, comprises, in its broadest sense, an elongated housing 30 having a rear portion and a front portion and an elasticized trigger means, shown generally as numeral 38, secured within said housing at the elasticized end of said trigger means by pin 36 positioned in the rear portion of said housing. When the trigger means has been pulled forward and cocked as shown in FIGURE 2, the trigger means is continuously being urged rearwardly by the tension created by the stretched elasticized portion 34 of the trigger. A clamping means 50 is connected to the trigger means by a flexible connecting means 56. The clamping means can be connected to a fishing line 12 by jaws 52 and 66. The jaws can be separated and the fishline released by exerting a squeezing action on appendages 60 and 62 of the clamping means. One important and distinguishing characteristic of the above clamping means is that it is capable of releasing the fishline held in its jaws when the trigger means has been actuated and said trigger means and clamping means are drawn rearwardly into the front portion of the tubular housing by the elasticized portion of said trigger means as shown in FIGURE 3.

More specifically, the fishline jerking device of this invention comprises a hollow tubular member 30 having a front and rear portion. The opening of the front portion may be slightly flared at 53 forming lip 44, if desired, to insure against snagging of the trigger means or clamping means as they are pulled into the mouth of the tubular member. The rear portion of the tubular member has a pin 36 passing through and at right angles to the walls of the tubular member.

The tubular member may be of most any length and can be constructed from any metal or synthetic material such as aluminum, copper, steel, plastic, etc. For most conventional fishing rods, a tubular member made from aluminum or steel approximately 4 to 10 inches long and having a diameter ranging from ¼ to ½ inch in diameter is satisfactory. However, for deep sea fishing, for example, a substantially larger and stronger device would, of course, be required. The physical size and shape of the other elements comprising the device of this invention is in most cases dependent on and directly related to the size and shape of the tubular member.

A coiled spring 34 located within said tubular member is attached at one end to pin 36. It should be noted that the elasticized portion 34 of the trigger means can be a separate element as is shown in FIGURES 4 and 5 or it can be part of the trigger means as shown in FIGURES 3 and 6. The elasticized member is preferably a coiled spring 34 and the trigger means consists of an elongated member 39 having intermediate its two ends a ledge 40 extending substantially downward and at substantially a right angle to the horizontal plane of the elongated member. Loops 42 and 43 are located at different ends of the elongated member. Loop 42 is used to connect coiled spring 34 to the elongated member while loop 43 is used to connect clamping means 50 through an intermediate flexible connecting means 56 to the elongated member. Although the flexible connecting means 56 may consist of any sort of bendable appendage such as a swivel ball-joint mechanism shown in FIGURE 5 as 58, connecting means 56 is preferably an inexpensive plastic, wire, line or chain such as that shown in FIGURES 2 and 3.

Although the trigger means previously described represents a preferred embodiment of this invention, it should be understood that the trigger means can take on a variety of physical shapes and forms. Any device capable of actuating the line jerking device when it receives a signal from the fishline and which possesses a suitable size and shape that it can easily be drawn into the tubular member may be used. In FIGURES 4, 5 and 6, various modified designs of the trigger means are shown. In FIGURE 4, for example, the elasticized trigger means 39 is constructed from a stiff wire bent to a stairstep configuration with loops 42 and 43 at either end. The elasticized portion or coiled spring 34 is, in this instance, a separate element hooked at one end through loop 42. In FIGURE 5, the trigger means is constructed from a continuous stiff wire for added strength with the leading edge of ledge 40 having sawtooth indentations 41 which can be used for setting the trigger mechanism. The different indentations can be used to regulate the amount of tension or pull required to actuate the trigger mechanism. In FIGURE 6, trigger means 38 is a solid piece of metal, plastic or other durable material having an opening 43 for connecting to a clamping means. In this particular embodiment the coiled spring member 34 is firmly secured to the trigger mechanism. Such devices or similar devices are referred to broadly as an elasticized trigger means or as a triggering means having an elasticized tail.

One of the more important and distinguishing characteristics of this invention over devices heretofore proposed is that the fishline is capable of being separated from the device of this invention within a fraction of a second after actuation. This is accomplished by having connected to the triggering device 38 through connecting means 56 clamping means 50 capable of automatically releasing a fishing line when the trigger means has been actuated and the clamping means is drawn into the opening of the front portion of the tubular housing by the elasticized portion of the trigger means.

In one particular embodiment of this invention the clamping means comprises two substantially-parallel appendages 60 and 62 crisscrossing near one end to provide adjacent ends with clasping jaws 52 and 66 positioned in opposed relation to each other. The other two ends of the appendages are integral with a coiled spring 64 which continuously urges jaws 52 and 66 to a closed position. Because of the crisscrossing appendages, it is possible to separate the jaws of the clasping device by merely applying a counteracting squeezing force to the appendages greater than the tension force provided by the coiled spring. This counteracting pressure is generally provided by the inner walls 70 and 72 of tubular member 30 when the clamping means is drawn into the tubular member by coiled spring 34. In order that a squeezing force can be applied to the appendages it is necessary that the distance between the appendages be slightly greater than the internal diameter of tubular member 30. Obviously, if the distance between the appendages 60 and 62 is too large or smaller than the internal diameter of the tubular member, contact of the appendages with the internal wall will be impossible and no squeezing action will occur. The internal diameter above referred to has reference to the main trunk or non-flared portion of the tubular member. This flared portion, as previously indicated, is primarily for the purpose of aiding the entrance of the trigger means and clamping means into the tubular member.

Although the above preferred clamping means is used in the jerking device of this invention, it should be understood that other shaped devices employing the basic principles above described can also be used if desired.

The device of this invention comes into use after the angler has made his cast. First the device is cocked. Cocking of the device of this invention is accomplished by manually pulling the trigger means 39 out of tubular housing 30 and by placing ledge 40 of the trigger means over lip 44 of the tubular housing. The coiled spring 34 having been extended by the pulling action is now exerting a substantial pulling force on ledge 40 against lip 44. The trigger means is then firmly held in place to prevent accidental actuation and the clamping means 50 is connected to fishline 14 through jaws 52 and 66. Jaws 52 and 66 are opened by squeezing appendages 60 and 62. Fishline 14 is then placed between the jaws and the squeezing pressure applied to the appendages released. FIGURE 2 shows the device of this invention in a ready or cocked position.

The trigger means is actuated by a tautening of fishline 14, pulling clamping means 50 forwardly and away from housing 30. This movement pulls ledge 40 off lip 44. The coiled spring 34 then pulls elongated member 39 and clamping means 50 into tubular housing 30. As appendages 60 and 62 come in contact with the inner walls 70 and 72 of housing 30 the appendages 60 and 62 are compressed or squeezed together causing jaws 52 and 66 to open and release fishline 14. Since fishline 14 is now free of the device, the reel can be used without fear of tangling the fishline and the device of this invention. As previously indicated FIGURE 3 shows the device of this invention after it has been actuated and fishline 14 freed from jaws 52 and 66.

Since certain obvious modifications may be made in the device of this invention without departing from the scope of the invention, it is intended that all matter contained in the foregoing description and shown in the accompanying drawings be interpreted merely as illustrative and not in a limiting sense.

What is claimed is:

1. A fishline jerking device comprising an elongated housing having a front portion and a rear portion, an elasticized trigger means secured within said housing at the elasticized end to the rear portion of said housing, said trigger means being continuously urged toward the rear portion of said housing when said trigger means has been extended forward in a cocked position and a fishline clamping means connected to said trigger means by a flexible connecting means, said clamping means comprising two substantially parallel appendages crisscrossing near one end thereof to provide two adjacent ends with clamping jaws positioned in opposed relation and the other two ends secured to a coiled spring which continuously urges said jaws to a closed position whereby said clamping means is capable of automatically releasing said fishline when said trigger means has been actuated and said clamping means is drawn into the front portion of said tubular member by the elasticized portion of said trigger means.

2. The device of claim 1 wherein the elasticized trigger means comprises an elasticized portion and a trigger portion.

3. The device of claim 2 wherein the elasticized portion comprises a coiled spring.

4. The device of claim 2 wherein the trigger portion comprises an elongated member having a ledge intermediate its two ends.

5. The device of claim 4 wherein the connecting means is a freely bendable appendage.

6. The device of claim 5 wherein the mouth portion of the tubular member is moderately flared.

7. The device of claim 6 wherein said device is adapted with a mounting means for attachment to a fishing rod.

8. The device of claim 4 wherein the trigger section comprises an elongated member having a ledge intermediate its two ends, said ledge having a plurality of indentations or notches along its leading edges.

References Cited

UNITED STATES PATENTS

| | | | |
|---|---|---|---|
| 2,204,560 | 6/1940 | Allison | 43—15 |
| 2,707,842 | 5/1955 | Humphreys et al. | 43—15 |
| 2,799,110 | 7/1957 | Miller | 43—15 |

SAMUEL KOREN, Primary Examiner

D. J. LEACH, Assistant Examiner